United States Patent [19]
Lien

[11] Patent Number: 5,859,850
[45] Date of Patent: Jan. 12, 1999

[54] ELASTIC STORE CIRCUIT FOR COMPOSITE CELLS SWITCHED THROUGH AN ATM NETWORK

[75] Inventor: Robert Leroy Lien, Batavia, Ill.

[73] Assignee: Lucent Technologies Inc., Murray Hill, N.J.

[21] Appl. No.: 579,706

[22] Filed: Dec. 28, 1995

[51] Int. Cl.$^6$ .................................................. H04L 12/56
[52] U.S. Cl. ........................... 370/396; 370/473; 370/466
[58] Field of Search ..................................... 370/395, 396, 370/464, 465, 466, 473, 474, 503, 508, 516; 375/371

[56] References Cited

U.S. PATENT DOCUMENTS

| | | | |
|---|---|---|---|
| 5,239,544 | 8/1993 | Balzano et al. ........................ | 370/465 |
| 5,384,774 | 1/1995 | Martin et al. ........................... | 370/395 |
| 5,568,486 | 10/1996 | Huscroft .................................. | 370/395 |

*Primary Examiner*—Benedict V Safourek
*Assistant Examiner*—Ken Vanderpuye
*Attorney, Agent, or Firm*—Jack R. Penrod

[57] ABSTRACT

A method and apparatus for interfacing ATM network packet type communications to STM frame type communications. This method and apparatus is especially useful for interfacing isochronous ATM cells to STM frames. The apparatus concerns an elastic store which receives ATM cells and sorts them in a set of FIFOs into their respective frames. The FIFO storing and retrieval method removes jitter and delay. A controlled clock within the elastic store clocks reads the information out of the FIFOs and into a STM network.

9 Claims, 4 Drawing Sheets

| MODULO N=2 | | MODULO N=3 | |
|---|---|---|---|
| PASS ROLLOVER NUMBER | PASS | PASS ROLLOVER NUMBER | PASS |
| 0 | 0 | 0 | 0 |
| 0 | 1 | 0 | 1 |
| 1 | 0 | 0 | 2 |
| 1 | 1 | 1 | 0 |
| 0 | 0 | 1 | 1 |
| | | 1 | 2 |
| | | 0 | 0 |
| | | 0 | 1 |
| | | 0 | 2 |
| | | 1 | 0 |
| | | 1 | 1 |
| | | 1 | 2 |

…

ELASTIC STORE CIRCUIT FOR COMPOSITE CELLS SWITCHED THROUGH AN ATM NETWORK

TECHNICAL FIELD

The invention relates to a circuit arrangement for temporarily storing data before switching that data, and more particularly to a method and apparatus for an elastic store for storing data from an asynchronous transmission mode (ATM) system prior to or subsequent to switching by a synchronous transmission mode (STM) switch.

DESCRIPTION OF THE PROBLEM

ATM is a data transmission mode that is growing in use throughout the world. For the most part ATM facilities are growing in parallel with the Synchronous Transfer Mode facilities which are still the work horse of telecommunications. But, the use of parallel STM and ATM networks if there is still available bandwidth on either, is a duplication. The STM network switches and transports synchronous time-slotted voice channels and the ATM network transports pure packet data. If the overlaid solution requires transporting both modes on one Synchronous Optical Network (SONET) link there is a need for separate STM and ATM 'pipes' in the SONET link. A formal proposal to create these 'pipes' as a part of SONET can be found in the ADAPT protocol standardization effort. Further development will be needed to implement such a proposal.

Synchronous time-slots can also be transported from a STM network through ATM networks using a ATM cell format called the composite cell. Composite cells transport up to 48 time slots in their payload with a different call or channel assigned to each octet in the cell payload. A standard ATM cell with a composite payload is shown in FIG. 1B.

Composite cells must be sent isochronously, that is at a regular rate, which is functionally equivalent to real time. Isochronous cells are not necessarily sent at exact intervals. The source switch may send the isochronous cells at any instant within $1/125$ microsecond STM network frame period. This means that composite cell transport is at best, quasi synchronous.

STM transport networks rely on some type of frame or channel delineation to mark the start of a frame of data and to synchronize the receiver with source or network timing. This frame delineation is not available in the current ATM transport network.

The establishment of ATM networks in parallel with STM networks is a needless duplication of equipment if the STM networks have excess capacity. On the other hand, bridging STM networks with one or more ATM networks is difficult because of the differences in the two transport standards. The use of composite ATM cells of various formats has been tried, but presents special problems, some of which are mentioned above. Other problems in using composite ATM cells to transport STM data are jitter (variable delay through the ATM switches) and clock recovery at the receiver if the source network clock is not available. FIG. 1A shows a data cell x1 that has been delayed into the next grouping of cells and must be re-ordered. Thus, there is a need in the art to efficiently integrate the transport of data via ATM and STM networks.

It is an object of the present invention to provide a method and apparatus for receiving composite ATM cells from an ATM network, storing each such ATM cell of the frame in a First-In-First-Out memory (FIFO), de-jittering the data within each ATM cell, synchronously reading this frame of ATM cells out of the FIFO, synchronizing the data from the ATM cell to an STM time slot and transmitting this data to STM equipment.

It is another object of the present invention to provide a method and apparatus for determining a beginning of each ATM cell and then using this determination to select a new FIFO in which to store this newly arriving ATM cell, without resorting to special cell headers, special frame markers, special VCIs or normal VCIs known-in-advance. This determination helps reestablish the 8 kilohertz STM network timing frame pulse that was not conveyed through the ATM network.

It is another object of the present invention to provide a method and apparatus for determining to which 125 $\mu$sec frame an arriving ATM cell belongs and routing this cell to a FIFO with other cells of the same frame, regardless of when the cell arrives. The method and apparatus are expandable to provide an arbitrary amount of jitter delay.

It is another object of the present invention to provide an elastic store method and apparatus that will insert the lowest possible queuing delay for any desired amount of jitter capability.

Its desirable that this queuing efficiency results from a method and apparatus of a type of elastic store that will be simple and inexpensive to implement and not require any initial knowledge of composite cell VCI values or require special or non-standard framing from the source.

SUMMARY OF THE INVENTION

Briefly stated in accordance with one aspect of the invention, the aforementioned objects are achieved by providing an apparatus, which receives isochronous ATM composite cells STM time slot data. This apparatus includes a router which selects a FIFO of N FIFOs into which data cells of a frame are routed. This router keeps a modulo N count of each VCI as it is received and routes each data cell to its selected FIFO of said N FIFOs. This count is used to selected which of the N FIFO's in which cells of a respective 125 $\mu$sec frame will be stored. The most significant bit of this count is called the rollover bit and is stored in each FIFO as a flag bit. A controllable oscillator is connected to one of the N FIFO's and is adjusted according to its fill level. Clock pulses of the controllable oscillator are used to read the data cells out of its respective FIFO as an STM frame by means of an output sequencer connected to an output of each of said N FIFOs. The sequence in which the FIFOs are read depends upon the rollover bit flags and other logic states associated therewith.

In accordance with another aspect of the invention, the aforementioned objects are achieved by providing a method which includes receiving from an ATM network a plurality of isochronous ATM composite cells and grouping each to its respective frame. Each isochronous ATM composite cell received is grouped with other cells of the original transmitted frame as part of the method. Any time jitter-and delay induced by passage through the ATM network is removed from the cells as another part of the method. If any cell has been delayed into a subsequent time period, re-ordering that data cell into its respective group as part of the method. Further, as part of the method, each cell from each group of cells is re-assembled into a corresponding frame of data.

DETAILED DESCRIPTION

Figure 1A:
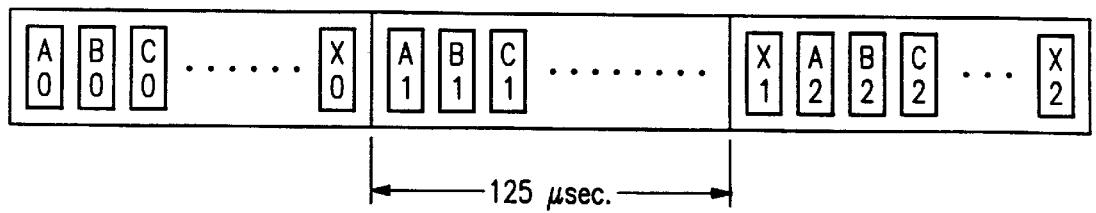
FIG. 1A and FIG. 1B form a diagram of the composite ATM cell format and of frames of ATM composite cells.
Figure 1B:
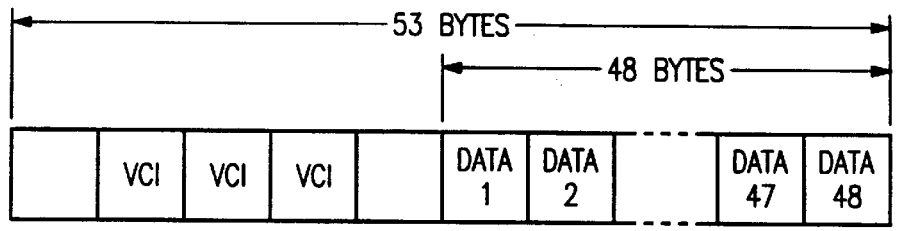
Figure 2:
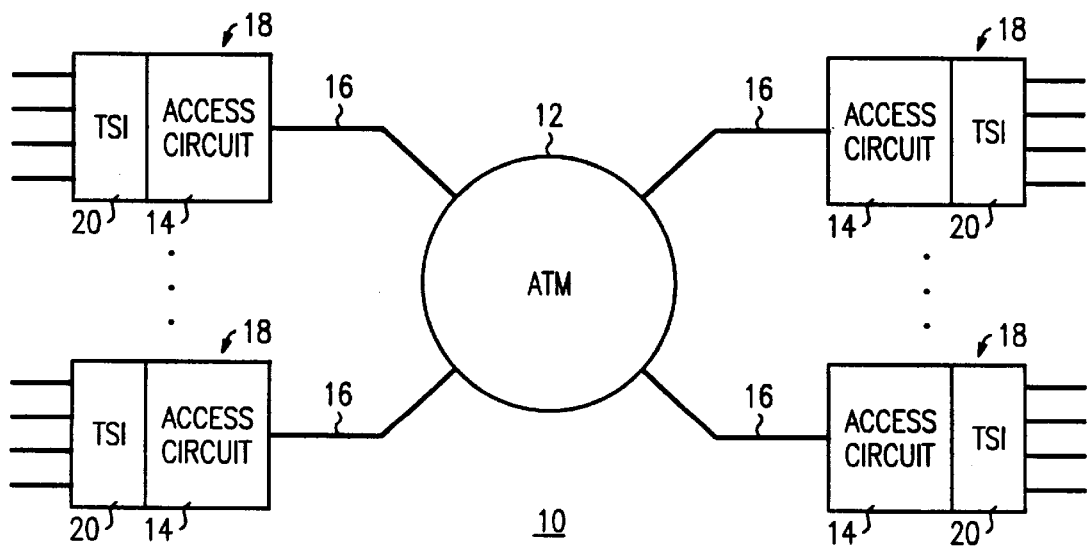
FIG. 2 is a block diagram of a switch network having an ATM switching hub, and end nodes in which the present invention may be used.

Referring now to FIG. 2, an example of a network 10 is shown. Network 10 has an ATM switch hub 12 with links 16 that can transport ATM cells between STM end nodes 18. ATM links 16 may be optical or electrical, or another ATM transmission mechanism. Each end node 18 has an access circuit 14 and a Time Slot Interchanger (TSI) 20. Each access circuit 14 provides interface circuits, as will be explained further with respect to FIG. 3 below, between its respective conductors 16 and TSI 20. Each TSI 20 of each end node 18 provides the function of disassembling received isochronous composite cells back into individual STM stream time slots. For this example, the access circuits 14 would be the location where elastic stores according to the present invention would be most applicable.

Composite ATM cells are also assembled, i.e. generated, by a modified TSI 20 from up to 48 STM time slots and transmitted on link 16 through hub 12 to another of the end nodes 18. To assemble an ATM composite cell, a TSI 20 inserts a header and then outputs the header and 48 time slots in the desired order to form a data payload for a ATM composite cell. In this direction. i.e., the transmit direction, the elastic store in access circuit 14 is bypassed and is not used. In the receive direction, each access circuit 14 dejitters and aligns the data cells before they are sent to the receive section of their respective modified TSI 20. Instead of sequentially receiving time slots, as is done in a standard TSI, each modified TSI 20 receives data cells from a ATM composite cell from its respective access circuit 14. The VCI of each composite ATM cell is used as an index or pointer to the location in a store where the cell data payload is located. At that location there is a block of 48 data slots reserved for the data cell payload. The payload is sequentially filed into this block. It should be noted that the cell order and arrival time is inconsequential but all cells must be received once during that frame period. The rest of the TSI operation is normal. It can be seen from this that the cell input to each TSI 20 has a degree of an asynchronous nature. This nature is known as isochronous.

Figures 3, 4:
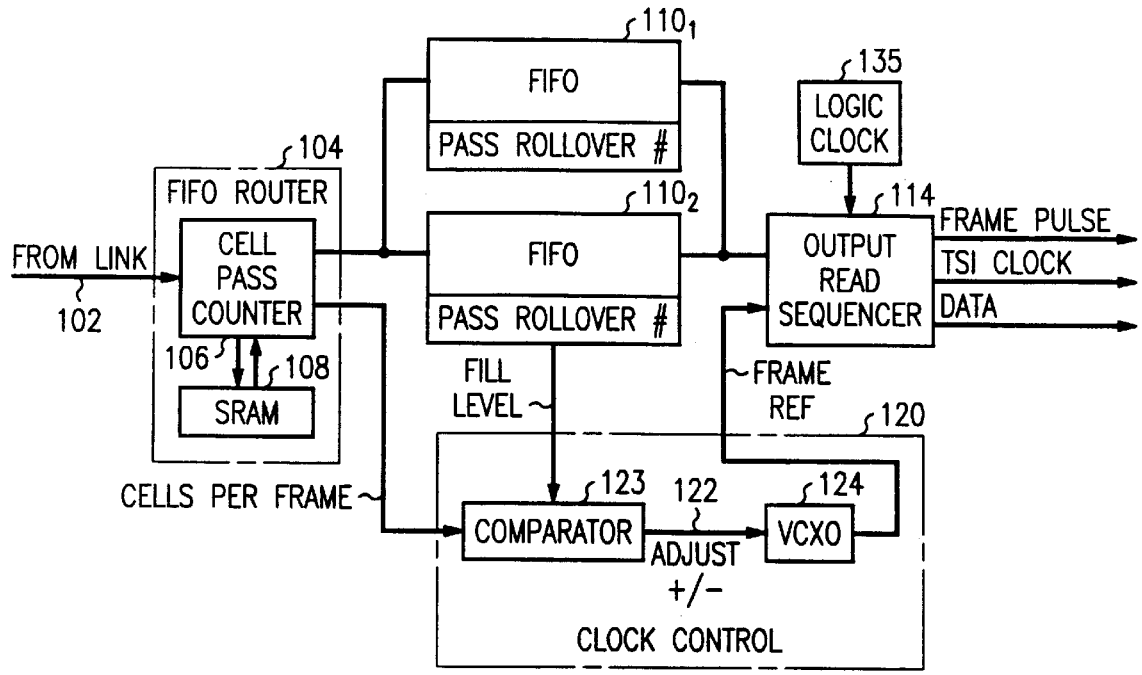
FIG. 3 is a block diagram of an elastic store according to the present invention.
FIG. 4 is a table illustrating the progression of states of the count digit and the pass rollover bit.

Referring now to FIG. 3, elastic store 100 is shown. Elastic store 100 has a FIFO router 104 which is connected via line 102 to an ATM link as described in ANSI T1.105 and ANSI T1.106. FIFO router 104 includes a cell pass counter 106 and a Static RAM (SRAM) 108. As an ATM composite cell is received from link 102, its VCI is extracted and used to address the previous pass count and rollover bit stored in SRAM 108. The value of each pass count for its respective VCI is used to direct each received ATM cell into FIFO $110_1$ or FIFO $110_2$. Each ATM composite cell pass count has a pass rollover bit associated with it by cell pass counter 106, as will be explained later. Each pass rollover bit is written into its respective FIFO $110_1$ or $110_2$ as a token or flag bit.

As shown in FIG. 3, cell pass counter 106 keeps a modulo N count, where N is the number of FIFOs. The amount of queuing dejitter capability of elastic store 100 in microseconds is given by the relation (N)*(125). In FIG. 3, N is two: so cell pass counter 106 keeps a modulo two count of the number of composite cells it receives and routes to FIFOs $110_1$–$110_2$. The count in cell pass counter 106 is incremented each time a VCI of a received ATM composite cell is detected. Such a count is shown in FIG. 4. The updated value in pass counter 106 is used to select or route the received ATM cell to its respective FIFO. As mentioned earlier, the pass counter for each VCI has a pass rollover bit associated with it. This bit is toggled when the pass counter returns to zero as shown in FIG. 4. The pass rollover bit marks the beginning of the next modulo sequence. It enables the read sequencer to synchronize itself to the incoming frame boundaries.

Output read sequencer 114 reads composite cells out of FIFOs $110_1$–$110_2$ to an attached circuit such as one of the TSIs 20. To interface to a TSI 20 the elastic store 100 must provide a frame pulse, a data clock signal and a data bus output (usually 8 bits wide). Clock 120 generates a frame pulse reference signal (nominally a 8000 hertz frequency) for read sequencer 114 by means of a voltage controlled oscillator 124, which is frequency adjusted by signal 122. Clock control 120 connects to a representative FIFO, FIFO $110_2$ in FIG. 3, to read a fill level thereof. The fill level of the representative FIFO $110_2$ is compared by compator 123 to the quantity $FL_0$, where $FL_0$=[N]*(the number of cells currently being received in a 125 microsecond frame). The amount of data is determined by checking the FIFO fill level at the start of a frame READ from FIFO $110_2$. If there is less than $FL_0$ cells remaining in FIFO $110_2$ at that time, VCXO 124 has its frequency adjusted lower and if there is more than $FL_0$ data bits remaining, VCXO 124 has its frequency adjusted higher. The adjustment input of VCXO 124 is time integrated to smooth out any rapid changes in the adjustment voltage. The phase of the output of VCXO 124 is inconsequential to the operation of the TSI 20.

The number of cells currently being received in a 125 microsecond frame can vary depending on the number of active channels or composite cells that are being received. This number is counted by FIFO router 104 and is also used by comparator 123 to control the FIFO fill level.

The frame pulse from read sequencer 114 is generated each time the sequencer 114 advances to the next FIFO. This output is in phase with the frame pulse reference generated by VCXO 124 and is aligned to the edges of the TSI data clock output by read sequencer 114. Another clock input to read sequencer 114 is the logic clock 135. The frequency of logic clock 135 must be greater than the highest FIFO read rate. For example, SONET OC3 input link the data byte rate is 19.44 Mhz. A good choice for this clock would be 22.528 Mhz, which is greater than 19.44 Mhz. This higher rate for logic clock 135 is needed because of the occurrence of non-fruitful read cycles when the sequencer 114 is paused or is polling an empty FIFO. The TSI data clock output from the read sequencer 114 is a gapped clock with a minimum period that is equal to that of the logic clock rate.

The FIFO sequencing of output read sequencer 114 is as follows: first, FIFO $110_1$ or $110_2$ is READ until a change in the pass rollover bit is detected, then it pauses until the present TSI frame period ends, after which a read of the next FIFO commences.

When read sequencer 114 wraps around to the first (lowest numbered) FIFO it will READ entries until it detects another change in the rollover bit. For example, if the previous change was 0 to 1 when it halted, on return it will READ cells until the value goes form 1 to 0. The rollover bit in all other FIFOs will always be set to 0 by FIFO router 104 and should be ignored by the read sequencer for this function.

If a FIFO empty indication is reached before the pass rollover bit changes, sequencer 114 continues to poll FIFO 110$_1$–110$_2$ for the duration of the TSI frame period. This polling will collect any cells arriving late due to worst-case jitter and/or delay.

The above described read sequencer process provides three functions for the present invention. First, it is a mechanism to reestablish a frame reference from the (jittered) incoming stream to synchronize itself and attached TSI 20. Second, it allows continuous write access to all FIFOs, instead of and using FIFOs or buffers in alternate write then read modes (double buffering). Third, the process allows the fill level to be less than one frame and still collect late arriving cells. The advantage of the second and third functions is to minimize queuing delays in the elastic store.

Figure 5:
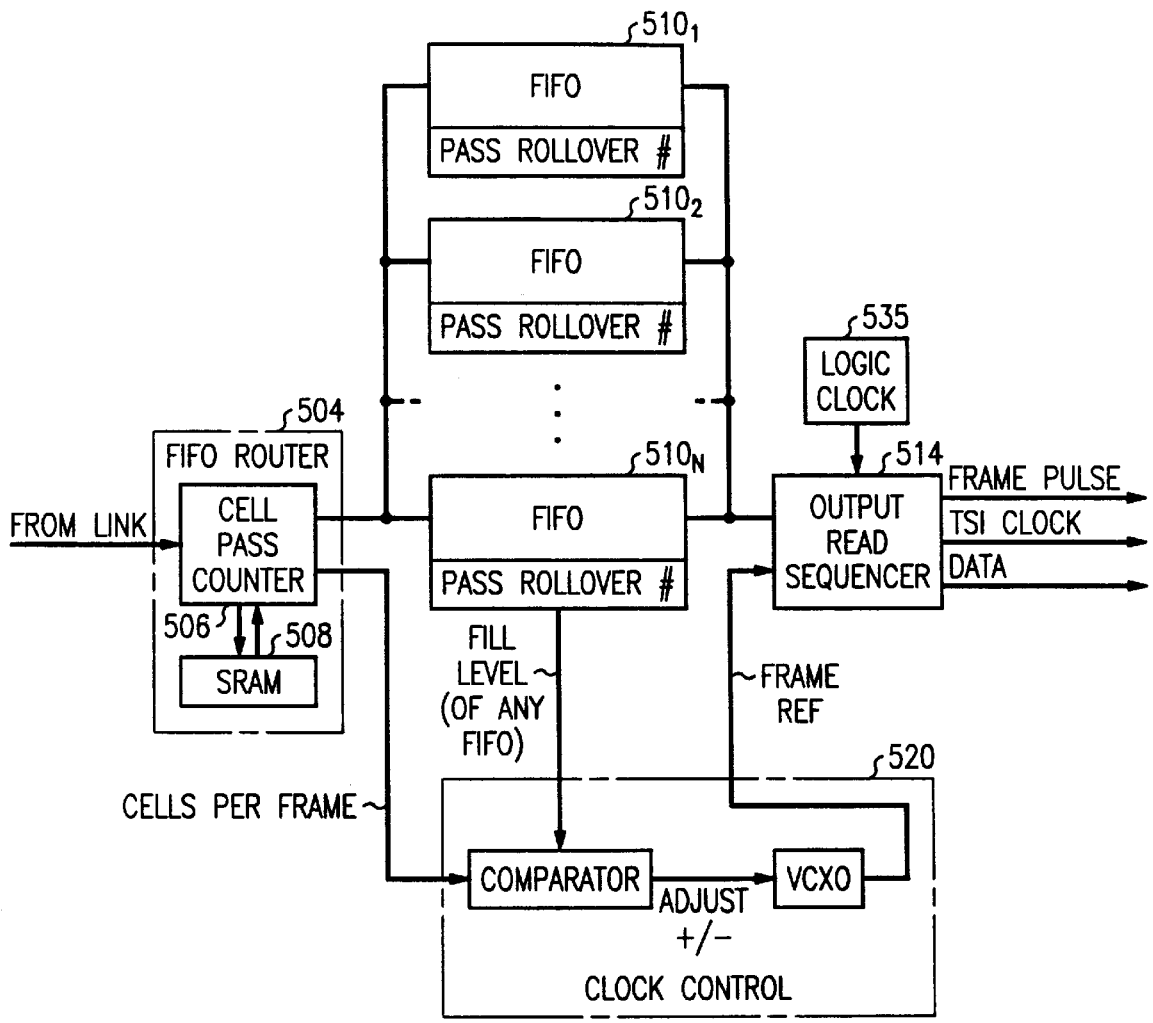
FIG. 5 is a block diagram similar to FIG. 3 only generalized for N FIFOs.

FIG. 5 shows an elastic store 500 that is similar to FIG. 3, the difference being that elastic store 500 has N FIFOs instead of just 2 as in FIG. 3. This allows for [N]*125 microseconds de-jittering time because more of the received data is stored in FIFO memory waiting to be READ out according to a frame clock. It is worth noting that FIFOs 510$_1$–510$_N$ are represented in this block diagram as individual FIFOs, which is one possible embodiment. A preferred embodiment would have the FIFOs 510$_1$–510$_N$ implemented in a static random access memory (SRAM) by partitioning such static random access memory into multiple FIFO stacks.

Figure 6:
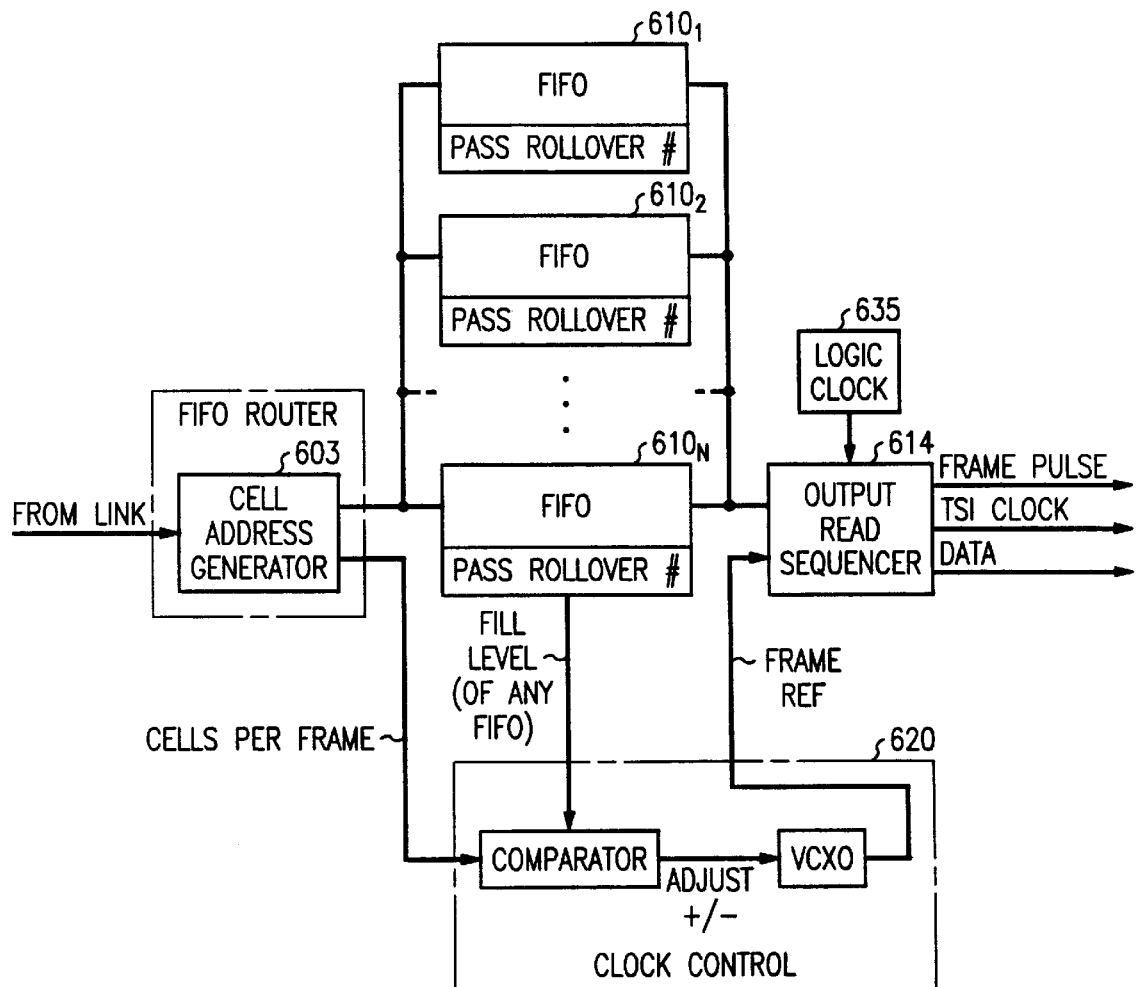
FIG. 6 is a block diagram similar to FIG. 3 generalized for N FIFOs but using a variant composite cell format to advantage.

FIG. 6 shows an elastic store 600 that is similar to FIG. 3 but with a modified FIFO router that uses a variant of the 48 time-slot composite cell to advantage. Composite cells with less than 48 octet payloads could use a standard ATM Adaptation Layer 1 (AAL 1) cell which has a modulo 16 cell sequence count field in the AAL 1 octet (octet 6 of the cell). A subset of these bits can be used to replace the pass counter function. The pass rollover bit must be generated by using the next highest bit of the cell sequence count to those chosen for the pass count. All other functions are required as in FIG. 3.

While the invention has been particularly illustrated and described with reference to preferred straight forward embodiments thereof, it will be understood by those skilled in the art that various changes in form, details, and applications may be made therein. It is accordingly intended that the appended claims shall cover all such changes in form, details and applications which do not depart from the spirit and scope of the invention.

What is claimed is:

1. A method comprising the steps of:

receiving from an ATM network a plurality of isochronous ATM composite cells;

grouping each isochronous ATM composite cell into its respective original transmitted frame;

said group using only a VCI from each isochronous ATM composite cell, respectively, without prior knowledge of such VCI or special frame markers;

removing any time jitter-and delay induced by passage through said ATM network from said data cell using FIFOs that may be continuously written;

assembling plurality of isochronous ATM composite cells into a corresponding STM frame of data.

2. The method of claim 1, further comprising the steps of:

recovering a frame clock from said plurality of isochronous ATM composite cells; and clocking cells into a respective STM frame with said frame clock.

3. The method of claim 1, wherein said jitter and delay removing step further includes the step of:

assigning one of N FIFOs to store the cells of its respective frame.

4. The method of claim 3, further comprising the steps of:

recovering a frame clock using FIFO fill level data from one of said N FIFOs to adjust a rate of a voltage controlled oscillator; and clocking each of said groups of data cells out of its respective FIFO into its respective STM frame of data with said frame clock.

5. The method of claim 3, further comprising the steps of:

recovering a frame clock using FIFO fill level from one of said N FIFOs to adjust a rate of a voltage controlled oscillator; and clocking at least one of said groups of frame cells out of its respective FIFO into a respective STM frame of data with said data clock while said FIFO is still receiving a cell of that group.

6. The method of claim 1, wherein said jitter and delay removing step further includes the steps of:

assigning one of N FIFOs to store the cells of its respective group;

storing cells of each group in its assigned FIFO;

storing a flag at the end of each data group in the FIFO assigned to that group; and reading cells out of its assigned FIFO into its respective STM frame of data until said flag is reached and then reading from a next FIFO of said N FIFOs.

7. An apparatus for receiving ATM cells and outputting corresponding frames of data on an STM link, said apparatus comprising:

a router for selecting a FIFO of N FIFOs into which data cells of a first ATM cell for a first frame of data are routed;

said router keeps a modulo N count of each VCI of each ATM cell respectively as it is received;

said count is used to route respective data cells from each ATM cell to select a respective FIFO of said N FIFOs for storage;

a more significant digit of said count is associated with each VCI and stored in each respective FIFO;

a controlled clock is connected to one of said N FIFO's and is adjusted by a fill level thereof; and an output sequencer is connected to an output of each of said N FIFOs and reads data stored therein in sequence as controlled by the more significant digits associated therewith into a respective frame of data; and each frame of is read out using clock pulses from said controlled clock and outputted on said STM link.

8. The apparatus of claim 7, further comprising a frame pulse generating circuit connected to said controlled clock for outputting frame pulses needed by STM protocol.

9. The apparatus of claim 7, wherein said N FIFOs are implemented by a static random access memory.

* * * * *